(No Model.)　　　　　　　　　　　　　　　　　　　　2 Sheets—Sheet 1.
S. D. CASTLE & A. SKAATS.
COUNTER BALANCE FOR FOLDING STEPS FOR BERTHS.
No. 286,998.　　　　　　　　　　Patented Oct. 23, 1883.
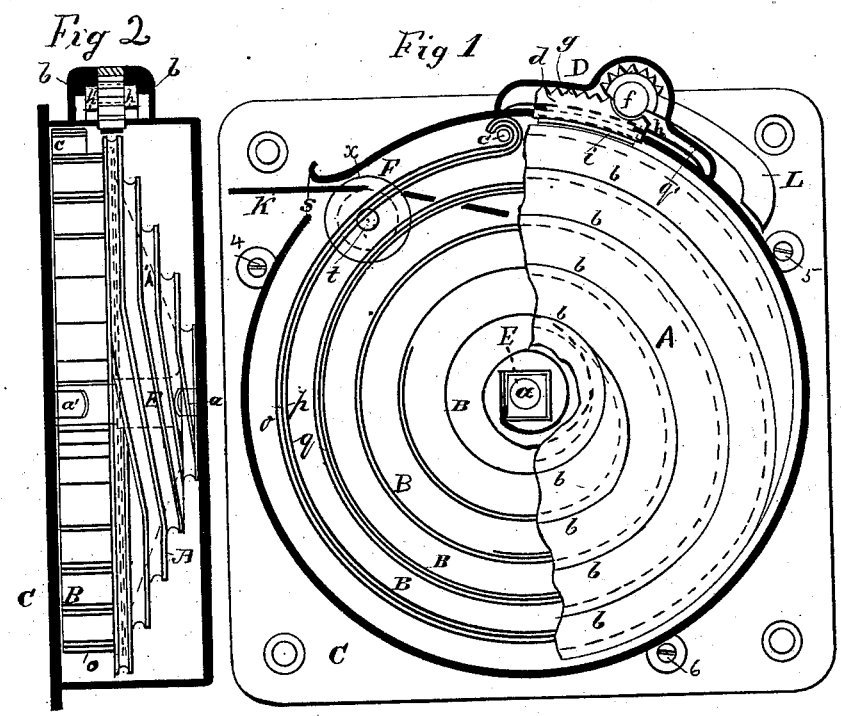
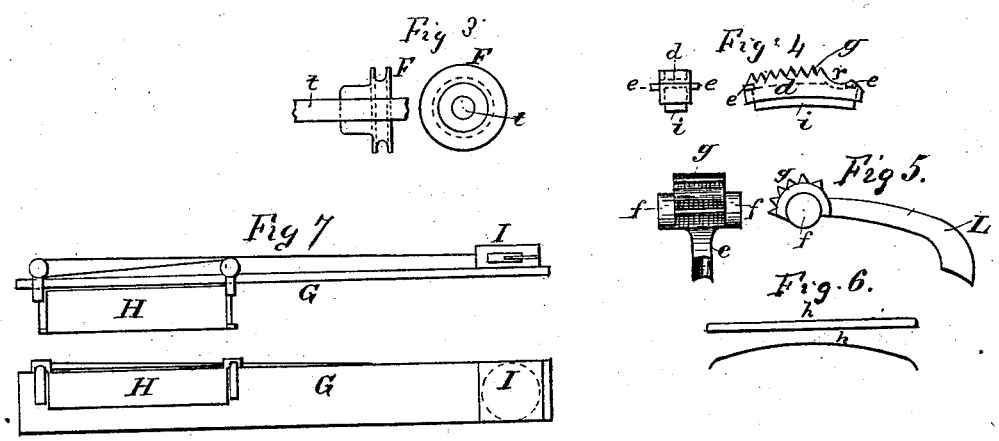

(No Model.) 2 Sheets—Sheet 2.
S. D. CASTLE & A. SKAATS.
COUNTER BALANCE FOR FOLDING STEPS FOR BERTHS.
No. 286,998. Patented Oct. 23, 1883.
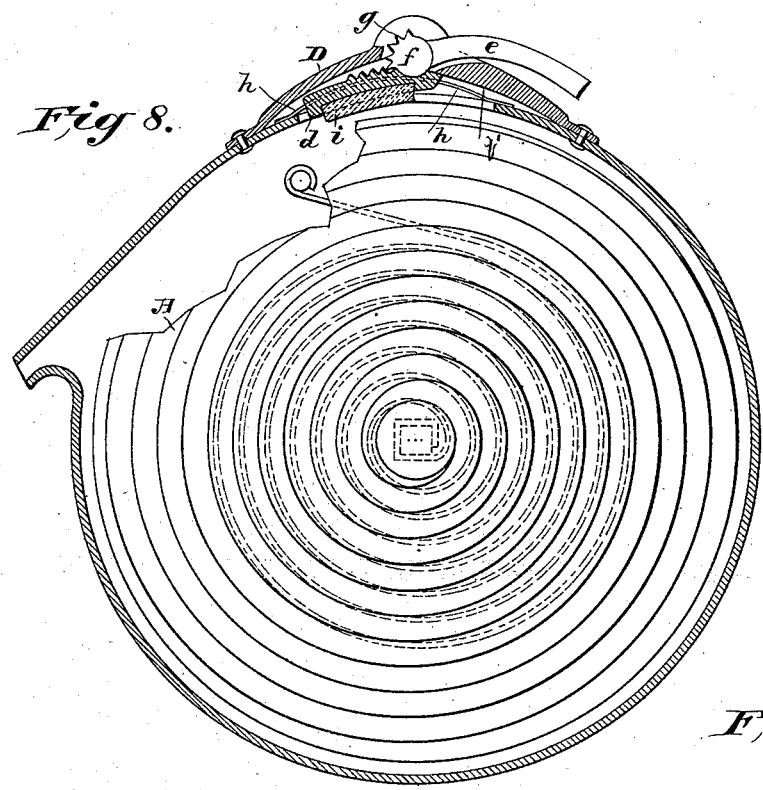
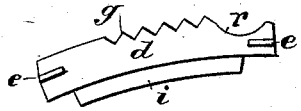
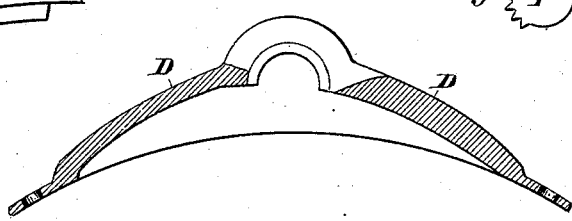
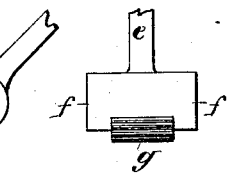
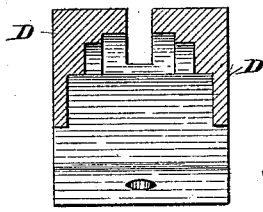

UNITED STATES PATENT OFFICE.

SAMUEL D. CASTLE AND ABRAHAM SKAATS, OF BRIDGEPORT, CONN.

COUNTER-BALANCE FOR FOLDING STEPS FOR BERTHS.

SPECIFICATION forming part of Letters Patent No. 286,998, dated October 23, 1883.

Application filed September 18, 1882. (No model.)

*To all whom it may concern:*

Be it known that we, SAMUEL D. CASTLE and ABRAHAM SKAATS, citizens of the United States, residing at Bridgeport, in the county of Fairfield and State of Connecticut, have invented certain new and useful Improvements in a Counter-Balance for Folding Steps for Sleeping-Car and Steamship Berths, of which the following is a specification.

Our invention relates to improvements in a counter-balance for folding steps for sleeping-car and steamship berths; and it consists—

First. In the manner of constructing the spirals or grades of the fusee. Each grade is kept the same diameter for three-fourths of the circumference of the grooves. The change from the increase or decrease of the grade is made in the remaining one-fourth.

Second. In arranging back of the grooves of the fusee a recess of sufficient depth to inclose a part of a coil-spring, and to provide for an axle to connect the fusee with the coil-spring, this axle also having bearings for pivots attached to an inclosing-case.

Third. In constructing the spring of three leaves or coils. The main coil, starting from a connection with axle of fusee and having the necessary turns, is connected with a pin fixed to the inclosing-case. The second coil is connected with the same pin, and is three-fourths the length of the main coil, and is coiled inside of the first. The third coil is one-half the length of the first, as is coiled inside of the second.

Fourth. In inclosing the fusee and spring in a case, the two inner faces of the sides having pivots, on which the fusee revolves, and a fixed stud for securing the outer end of the coil-spring.

Fifth. In providing a grooved sheave having a lateral and revolving motion on a fixed stud over which the cord passes to the fusee, to correctly guide the cord to the grooves of the fusee.

Sixth. In attaching a sliding brake and lock to the device that bears on the outer groove of the fusee that will carry it beyond the point of rotation given by the spring, drawing the folded step more firmly against the berth-rail and locking it in that position.

Figure 1 is a front view, with the fusee partially cut away to show the spring. Fig. 2 is a sectional view of the device. Fig. 3 is a view of the guide-sheave. Fig. 4 is a side end view of the brake-case. Fig. 5 is a side and end view of the brake-lever; Fig. 6, two views of the spring that lifts the brake from the fusee; Fig. 7, two views of the device, attached to the berth-rail and the steps. Fig. 8 is a vertical elevation of the case, showing the fusee and spring-and-brake attachment; Fig. 9, a section of the brake-case; Fig. 10, a cross-section of the same; Fig. 11, an enlarged side view of the brake; Fig. 12, a face and side view of the brake-lever.

The fusee A is of any suitable material, and is provided with an axle, E, long enough to receive the center of the spring B. The opposite ends of this axle are bored to receive the pivot-points $a$ and $a'$, cast to the case C. The end of axle E for the spring B is made square, and in working it has a tendency to tighten the hold of the spring on the axle E. In forming the grade of the fusee A, we keep the grades $b\ b\ b$ an equal diameter for three-fourths of the circle, then drop to the next in one-fourth, thereby saving room in a longitudinal direction of the fusee, and giving a greater length of the cord K. We attach the cord to the outer periphery of the fusee by any suitable device. The spring B is made threefold in the drawings; but we do not confine ourselves to that number, the outer leaf, O, of the coil running from the holding-pin $c$ to the axle E in one piece. The second leaf, P, starting at $c$, coils inside the outer leaf for three-fourths of its length, and ends without any connection further with the leaf O. The third leaf, $q$, starts at $c$ and coils inside of P one-half of the length of O, and ends in the same manner as P. The back of the fusee A is recessed out, so that the spring B is partially inside of it, saving room in the depth of the case confining the spring to an equal distance on its outside coil from the center, insuring more even work than it would have, if allowed to spring away and bind on its edges. The case C is in two parts, one piece for securing it to the berth-rail, the other forming the cover of the device. To the case C we cast the pivots $a$ and $a'$, for the axle of fusee A, also the holding-pin $c$. This case is held together by the screws 4 5 6. At the opening s in the case C we set a stud, t, for the sheave F to revolve on, allowing the sheave F to work back and forth on the stud t. The groove in the sheave F is made deep enough to allow the cord free play, while its outer flanges, x, nearly touch the case C, so that the cord K cannot get out of place. The sliding brake d, inclosed in an outer case, D, is provided with bearings for the axle f of the lever L to work in, and secures the springs h and h' in place. The portion q' is inclined toward the fusee A. The brake d is a hollow case filled with an elastic substance, i, and, when working, bears directly on the periphery of the fusee A. On the sides of this brake are four small ears, e, that project out the width of the springs h and h', and rest on the top of these springs, so that when the brake is thrown out of connection with the fusee A, the springs h and h' will lift the brake off from the fusee A, allowing it to work freely on the top of this brake. r is a depression to match the curve of the axle of the lever L at f. From this depression the outer face of the brake rises at an angle of forty-five degrees, sufficiently to cause the brake, when depressed by the operation of the lever L, to more than fill the space existing between the brake d, when not applied, and the fusee A. We then form the teeth g g with corresponding teeth on the lever L. By turning the lever toward the front of the case in the direction of the arrows, the lever L, operating on the teeth of the brake, carry it back under the incline q', that, operating with the lever L, forces the brake firmly onto the fusee, carrying it over and increasing the tension of the cord K, drawing the steps H securely against the front of the berth-rail, preventing rattling, and securing them against working loose by the motion of the cars or steamer. By turning the lever L in the opposite direction the brake is carried back, and the springs h and h' lift it up into the case D, thus clearing the fusee.

In using the device, we attach the case at the head end of the berth-rail, the lever L up, and carry the cord K to the cord of the steps H, that runs through the sheave and arms, as shown in application filed May 4, No. 60,429, coiling up the spring and unwinding the cord K from the fusee A. The grades of the fusee A are so constructed that it will counterbalance the unequal weight of the steps as they fold up. The last grade is so arranged that there is a surplus of power required to hold the steps against the side.

What we claim, and desire to secure by Letters Patent, is—

1. The fusee A, having grades b b b, arranged, substantially as described, the back of said fusee A recessed for spring B, the axle E, provided with the bearings a and a', as and for the purpose specified.

2. The combination, substantially as described, of a leaf-coiled spring (said leaf-coiled spring having leaves all starting from the holding-stud C, one coiling outside the others and connected to axle E, the others in different lengths, to re-enforce the first coil) with the fusee A, as and for the purpose specified.

3. The combination, substantially as described, of the case C, having the pivoted points a and a', the holding-stud c, and opening s, with the fusee A and spring B, as and for the purpose specified.

4. The combination, substantially as described, of the guide-sheave F working on the stud t, with the case C, fusee A, and spring B, for the purpose specified.

5. The sliding brake d, the elastic filling i, the depression r, teeth g g, toothed lever L, springs h and h', and case D on case C, when all are arranged and operated as and for the purpose specified.

6. The combination, substantially as described, of the fusee A, spring B, cord K, case C, sheave F, and brake d, arranged for the purpose specified.

7. The combination, substantially as described, of the fusee A, spring B, case C, brake d, cord K, with the folding steps H, attached to a berth-rail to produce a counter-balance folding steps for railway and steamship berths.

SAMUEL D. CASTLE.
ABRAHAM SKAATS.

Witnesses:
GEO. Z. SKAATS,
C. W. PHIPPS.